United States Patent
Barfoot et al.

(10) Patent No.: US 9,557,195 B2
(45) Date of Patent: Jan. 31, 2017

(54) APPARATUS AND METHOD OF MULTIPLEXED OR DISTRIBUTED SENSING

(71) Applicant: Halliburton Energy Services, Inc., Houston, TX (US)

(72) Inventors: David Andrew Barfoot, Houston, TX (US); Glenn McColpin, Katy, TX (US); Mikko Jaaskelainen, Katy, TX (US); John Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/769,977

(22) PCT Filed: Aug. 7, 2013

(86) PCT No.: PCT/US2013/053924
§ 371 (c)(1),
(2) Date: Aug. 24, 2015

(87) PCT Pub. No.: WO2015/020642
PCT Pub. Date: Feb. 12, 2015

(65) Prior Publication Data
US 2016/0003648 A1 Jan. 7, 2016

(51) Int. Cl.
*G01D 5/30* (2006.01)
*G01D 5/353* (2006.01)

(52) U.S. Cl.
CPC ...... *G01D 5/35312* (2013.01); *G01D 5/35306* (2013.01); *G01D 5/35316* (2013.01); *G01D 5/35338* (2013.01); *G01D 5/35361* (2013.01)

(58) Field of Classification Search
CPC ............ G01D 5/35312; G01D 5/35361; G01D 5/35316; G01D 5/35306; G01D 5/35338
See application file for complete search history.

(56) References Cited

U.S. PATENT DOCUMENTS

| | | | | |
|---|---|---|---|---|
| 5,925,879 A | * | 7/1999 | Hay | ............. E21B 33/1243 250/227.14 |
| 5,945,665 A | * | 8/1999 | Hay | ............. G01B 11/18 250/227.14 |

(Continued)

FOREIGN PATENT DOCUMENTS

| | | |
|---|---|---|
| JP | 9270090 A | 10/1997 |
| WO | WO-2010116119 A9 | 2/2012 |
| WO | WO-2015020642 A1 | 2/2015 |

OTHER PUBLICATIONS

"Honeywell—High Temperature Crystal Clock Generator—(HTCCG)", [Online]. Retrieved from the Internet: <URL: http://www.honeywell.com/sites/servlet/com.merx.npoint.servlets.DocumentServlet?docid=DA5F0E274-7A61-B672-0E4A-54679F1399A0>, (Jan. 8, 2013—Accessed), 4 pgs.

(Continued)

*Primary Examiner* — Tony Ko
(74) *Attorney, Agent, or Firm* — Chamberlain Hrdlicka

(57) ABSTRACT

Various embodiments include apparatus and methods to measure a parameter of interest using a fiber optic cable. The parameters can be provided by a process that provides for multiplexed or distributed measurements. A multiplexed or a distributed architecture can include acoustic sensor units placed selectively along an optical fiber such that the acoustic sensor units effectively modulate the optical fiber with information regarding a parameter to provide the information to an interrogator coupled to the optical fiber that is separate from the acoustic sensor units.

31 Claims, 11 Drawing Sheets

(56) References Cited

U.S. PATENT DOCUMENTS

| | | | | |
|---|---|---|---|---|
| 5,973,317 | A * | 10/1999 | Hay | G01B 11/18 |
| | | | | 250/227.14 |
| 6,175,108 | B1 * | 1/2001 | Jones | G01P 15/093 |
| | | | | 250/227.14 |
| 6,305,227 | B1 * | 10/2001 | Wu | E21B 47/123 |
| | | | | 73/705 |
| 2004/0141420 | A1 | 7/2004 | Hardage et al. | |
| 2004/0197050 | A1 | 10/2004 | Lovseth et al. | |
| 2009/0132183 | A1 | 5/2009 | Hartog et al. | |
| 2010/0207019 | A1 | 8/2010 | Hartog et al. | |
| 2012/0179378 | A1 | 7/2012 | Duncan et al. | |

OTHER PUBLICATIONS

"International Application Serial No. PCT/US2013/053924, International Search Report mailed May 23, 2014", 3 pgs.

"International Application Serial No. PCT/US2013/053924, Written Opinion mailed May 23, 2014", 4 pgs.

"ROC Permanent Downhole Gauges", [Online]. Retrieved from the Internet: <URL: http://www.halliburton.com/public/wd/contents/Data_Sheets/web/H07001_ROC%20Gauges.pdf>, (2010), 3 pgs.

Glisiae, B., et al., "Long-Gage Fiber Optic Sensors for Global Structural Monitoring", First International Workshop on Structural Health Monitoring of Innovative Civil Engineering Structures, ISIS Canada, (Sep. 19-20, 2002, Winnipeg, Manitoba, Canada), (2002), 285-295.

Laman, J. A., et al., "Long Gage-Length Interferometric Fiber-Optic Sensors for Damage Detection in Bridge Structures", Final Report for Highway IDEA Project 58, (Feb. 2002), 31 pgs.

Posey, Jr., R., "Strain sensing based on coherent Rayleigh scattering in an optical fibre", Electronics Letters, 36(20), (2000), 1688-1689.

Rodrigues, C., et al., "Long-gauge fibre optic sensors: performance comparison and applications", Int. J. Lifecycle Performance Engineering, vol. X, No. Y, 1-26.

Shatalin, S. V., et al., "Interferometric optical time-domain reflectometry for distributed optical-fiber sensing", Applied Optics, 37(24), (1998), 5600-5604.

Tennyson, R. C., et al., "Long gage-length fiber optic sensors for monitoring pipeline integrity", Proc.of SPIE, vol. 6167, (2006), 61671C-1-61671C-13.

Wang, Z., "Intrinsic Fabry-Perot Interferometric Fiber Sensor Based on Ultra-Short Bragg Gratings for Quasi-Distributed Strain and Temperature Measurements", Dissertation, Virginia Polytechnic Institute and State University, (Dec. 14, 2006), 129 pgs.

"Australian Application Serial No. 2013397601, First Examiner Report mailed Mar. 10, 2016", 2 pgs.

"Australian Application Serial No. 2013397601, Subsequent Examiner Report mailed May 5, 2016", 3 pgs.

"Australian Application Serial No. 2013397601, Voluntary Amendment filed Dec. 10, 2015", 5 pgs.

* cited by examiner

APPARATUS AND METHOD OF MULTIPLEXED OR DISTRIBUTED SENSING

PRIORITY APPLICATIONS

This application is a U.S. National Stage Filing under 35 U.S.C. §371 from International Application No. PCT/US2013/053924, filed on Aug. 7, 2013, and published as WO2015/020642 on Feb. 12, 2015, which application is incorporated herein by reference in its entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. It is important to monitor the physical conditions inside the borehole of an oil well, in order to ensure proper operation of the well. A borehole is a challenging environment, with temperatures that can approach 150 degrees C. (302 degrees F.), 175 degrees C. (347 degrees F.), or even 200 degrees C. (392 degrees F.), and pressures that can approach 25 kpsi (172 MPa, or about 1700 atmospheres), or even 30 kpsi (207 MPa, or about 2000 atmospheres). There is ongoing effort to develop systems and methods that can allow for more flexibility without significant loss of precision in systems and techniques to measure parameters downhole at a drilling site.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
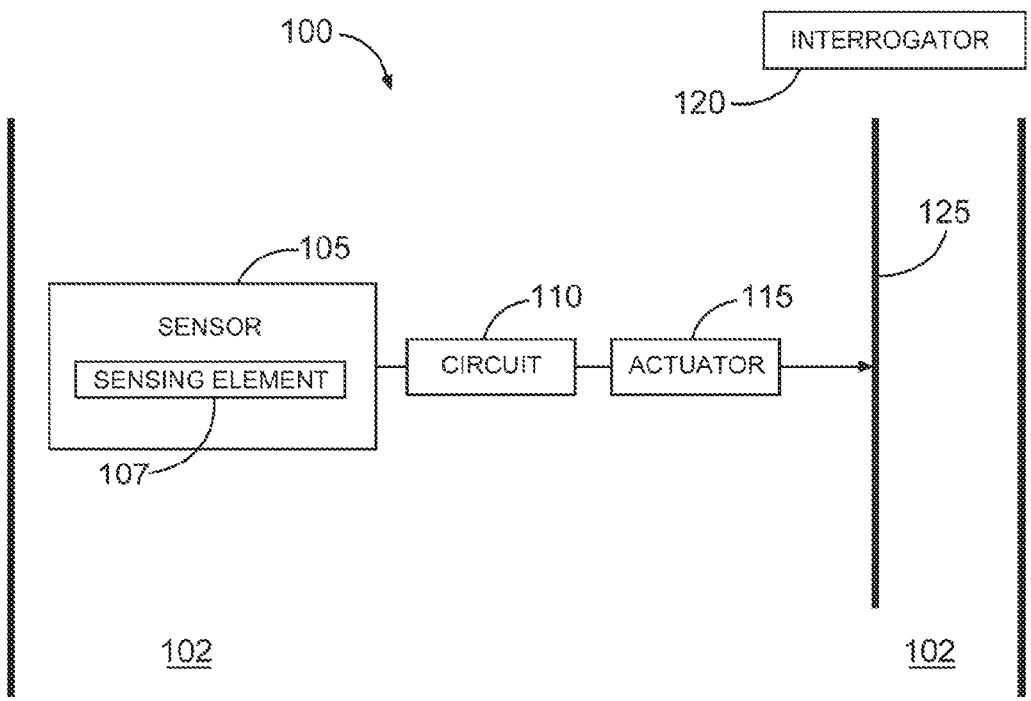
FIG. 1 shows a block diagram of features of an example system operable to provide a mechanism to measure parameters of interest indirectly using a fiber optic cable, in accordance with various embodiments.

FIG. 1 shows a block diagram of features of an example embodiment of a system 100 operable to provide a mechanism to measure parameters of interest indirectly using a fiber optic cable. System 100 can include a sensor 105, a circuit 110 coupled to the sensor 105, an actuator 115 coupled to the circuit 110, and an interrogator 120. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, or a pressure. The sensor 105 has the capability of being disposed at a location in proximity of an optical fiber 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tubing that can be pushed through into a horizontal area of operation. The system 100 may be used with other drilling related arrangements.

The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to the optical fiber 125 with the actuator 115 arranged in proximity to the optical fiber 125. The actuator 115 can be arranged in proximity to the optical fiber 125 at the effective location of the sensor 105. The actuator 115 can be structured to be operable to generate the perturbation to the optical fiber 125 with the actuator 115 in contact with the optical fiber 125. The actuator 115 can be structured to be operable to generate the perturbation to the optical fiber 125 with the actuator 115 a distance from the optical fiber 125. The actuator 115 may be realized as a non-contact piezoelectric material, which can provide acoustic pressure to the optical fiber 125 rather than transferring vibrations by direct contact. The actuator 115 can be realized with a piezoelectric crystal with fiber wrapped around it.

The optical fiber 125 can be perturbed with the optical fiber 125 in direct contact with the actuator 115 structured as a vibrator or with the actuator 115 structured having a form of voice coil at a distance away from the optical fiber 125. The perturbation of the optical fiber can be provided as a vibration of the optical fiber 125 or a strain induced into the optical fiber 125. Other perturbations may be applied such that the characteristics of the optical fiber are altered sufficiently to affect propagation of light in the optical fiber 125. With the effects on the light propagation related to a signal that generates the perturbation, analysis of the effected light propagation can provide data with respect to the signal that generates the perturbation.

The interrogator 120 can be structured to interrogate the optical fiber 125 to analyze signals propagating in the optical fiber 125. The interrogator 120 can have the capability to couple to the optical fiber 125 to receive an optical signal including the effects from the perturbation of the optical fiber 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber 125. An example of a short pulse can include a pulse of 20 nanoseconds long. As the pulse travels down the optical fiber 125, back scattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillioun frequency, or combinations thereof.

The interrogator 120 can be arranged with the optical fiber 125 to use an optical signal provided to the interrogator 120 from perturbing the optical fiber 125 at a location along the optical fiber 125. An arrangement different from using an optical signal backscattered from the perturbation can be utilized. For example, the optical fiber 120 can be structured having an arrangement selected from a fiber Bragg grating disposed in the optical fiber in vicinity of the actuator, a non-wavelength selective in-line mirror disposed in the optical fiber in vicinity of the actuator, intrinsic Fabry-Perot interferometers as a mode of interrogation from fiber Bragg gratings placed apart in the optical fiber such that each fiber Bragg grating is in vicinity of a respective actuator, Fizeau sensors in the optical fiber, a second optical fiber to transmit an optical signal from a perturbation of the optical fiber to a detection unit of the interrogator, or other arrangements to propagate a signal, representative of a measurement, in an optical fiber to an interrogation unit to analyze the signal to extract a value of a parameter that is the subject of the measurement.

Figure 2:
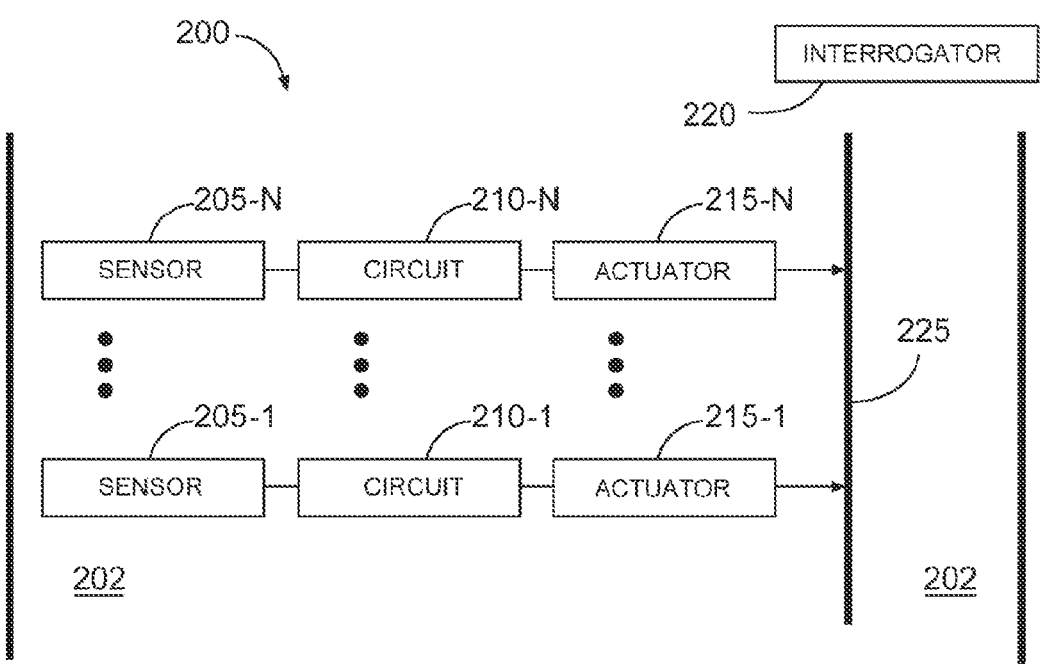
FIG. 2 shows a block diagram of an example system having a number of sensors deployable along the length of an optical fiber, in accordance with various embodiments.

FIG. 2 shows a system 200 having a number of sensors 205-1 . . . 205-N deployable along the length of an optical fiber 225 in a region 202. Each sensor is spaced apart from the other sensors of the number of sensors 205-1 . . . 205-N, where each sensor has an associated circuit, one of circuits 210-1 . . . 210-N, and an associated actuator, one of actuators 215-1 . . . 215-N, to perturb the optical fiber to communicate a measurement using interrogator 220. Each of sensors 205-1 . . . 205-N may be constructed similar or identical to sensor 105 of FIG. 1 including having its associated circuit and actuator constructed similar or identical to circuit 110 and actuator 115, respectively. The combination of a sensor, its respective circuit, and its respective actuator may be considered as a sensor unit.

System 200 as structured in FIG. 2 provides for sensing units distributed along the path of the optical fiber 125. Such a sensing system with distributed sensing units can allow parameters of interest to be provided by a process that provides for multiplexed and/or distributed measurements. With each sensor applying a perturbation as a function of the parameter of interest, the associated optical fiber is being stretched, which changes the affected path such that the phase information received at an interrogator from each respective location will shift in phase. With the number of sensors 205-1 . . . 205-N applying a perturbation, an optical phase shift along the fiber is being measured in a time division multiplex manner along the fiber. A single sensor unit architecture can provide for distributed measurements with the sensor 105, circuit 110, and actuator 115 of FIG. 1 moveable along the optical fiber 125 with measurements taken at selected locations along the optical fiber 125 and/or selected times.

Figure 3:
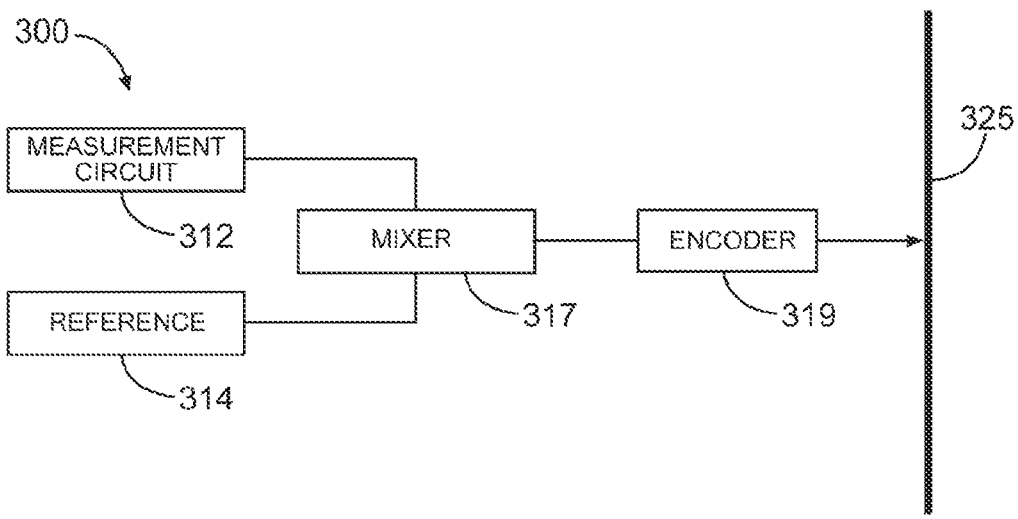
FIG. 3 shows an example circuit that may be implemented in the circuit of FIG. 1 and the circuits of FIG. 2, in accordance with various embodiments.

FIG. 3 shows a circuit 310 that may be implemented in circuit 110 of FIG. 1 and circuits 210-1 . . . 210-N of FIG. 2. The circuit 310 can include a measurement circuit 312 and a reference 314 to generate the signal correlated to the parameter in response to the measurement by a sensor such as sensor 105 of FIG. 1 and sensors 205-1 . . . 205-N of FIG. 2. The generated signal can be a resultant signal from an output of the measurement circuit 312 and the reference 314 directed to a mixer 317. The generated signal from the mixer 317 can be generated as a difference of the measurement using the sensor and the reference. The difference can include a difference of frequency between a frequency of the signal generated from the measurement circuit 312 and a frequency of the reference 314. Depending on the parameter of interest being investigated, the reference 314 may be a known level of a modeled parameter.

The reference 314 can be realized as a reference circuit 314 that outputs a reference signal that can be mixed with the output signal from the measurement circuit 312. The measurement circuit 312 can include a resonating element that has a complex impedance that changes based on the parameter of interest being measured. The reference circuit 314 can include a resonating element that has a complex impedance, where the resonating element of the reference circuit 314 can be arranged to be unaffected by the parameter of interest being measured that changes the complex impedance of the resonating element of the measurement circuit 312. For example, with pressure being the parameter of interest being measured at a location, a pressure sensitive membrane can be coupled to the resonating element of the measurement circuit 312, while the resonating element of the reference circuit can be isolated from the pressure. The resonating element of the measurement circuit 312 can include a first quartz crystal coupled to pressure external to the associated sensor such that the first quartz crystal changes frequency based on the external pressure, and the resonating element of the reference circuit 314 can include a second quartz crystal not coupled to the external pressure such that the second quartz crystal does not change frequency based on the external pressure. A third quartz crystal can be included to determine temperature at the location. Alternatively, the system 100 can include a distributed temperature sensing (DTS) arrangement using the optical fiber 125 to determine temperature at the location.

The measurement circuit 312 and the reference circuit 314 can comprise discrete components. With the measurement circuit 312 and the reference circuit 314 of circuit 310 structured with discrete components, the system 100 of FIG. 1 and the system 200 of FIG. 2 can be substantially an analog system. However, in an embodiment, the circuit 310, arranged as circuit 110 of FIG. 1 and/or circuits 210-1 . . . 210-N of FIG. 2, or an actuator coupled to the circuit 310, such as actuator 115 of FIG. 1 and/or actuators 215-1 . . . 215-N of FIG. 2, can include an encoder 319 to encode digital data correlated to the parameter in response to the measurement such that the digital data is encoded onto the optical fiber. The encoder 319 can be include a processor to implement a phase-shift keying communication scheme. The phase-shift keying communication scheme can include one or more of differential phase shift keying, binary phase shift keying, quad phase shift keying, or quadrature amplitude modulation. In various embodiments, the actuator 115 of FIG. 1 and/or actuators 215-1 . . . 215-N of FIG. 2 can be realized as an encoder with a digital or an analog input and a digital output to encode measurement data on the optical fiber 125.

Figure 4:
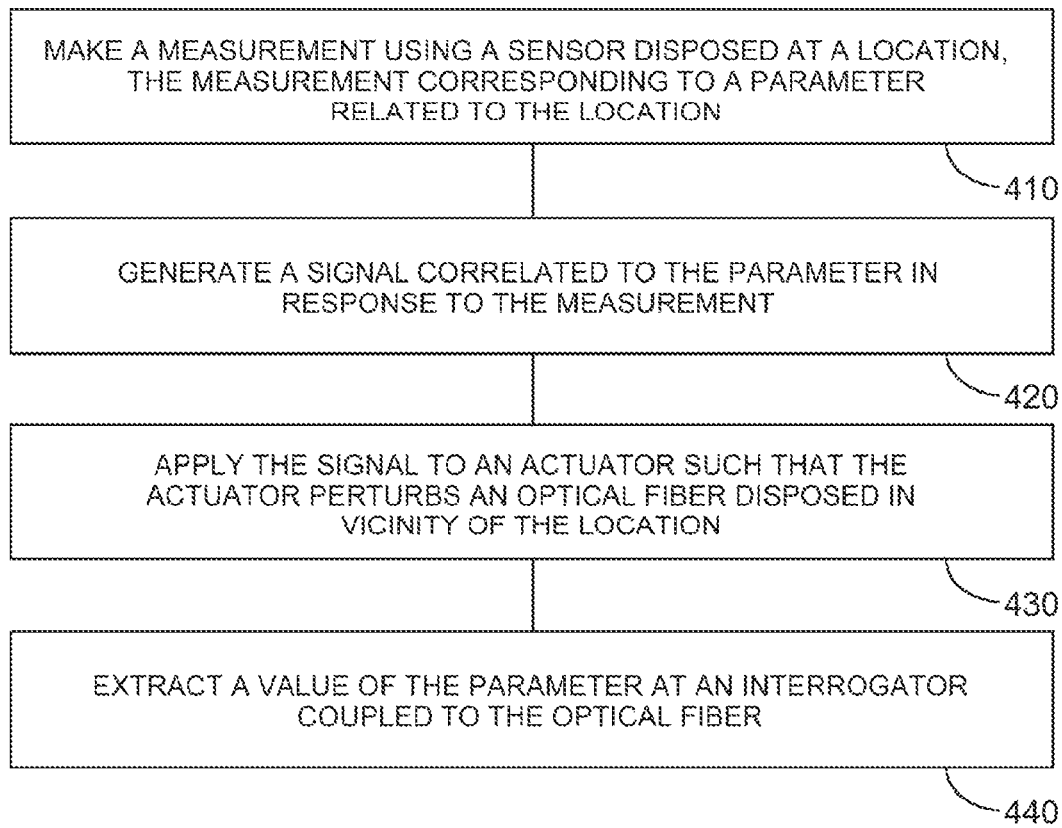
FIG. 4 shows features of an example method to measure parameters of interest using an optical fiber, in accordance with various embodiments.

FIG. 4 shows features of an example embodiment of a method to measure parameters of interest using an optical fiber. At 410, a measurement using a sensor disposed at a location is made, where the measurement corresponds to a parameter related to the location. The parameter can include one of a chemical concentration, a pH, a temperature, or a pressure.

At 420, a signal correlated to the parameter is generated in response to the measurement. The signal can be a compensated signal, where a compensated signal is a signal having a characteristic that corresponds to the parameter of interest for which variations in one or more other parameters is substantially corrected or removed, or for which the characteristic is isolated to the parameter of interest. Generating the signal correlated to the parameter in response to the measurement can include generating a difference signal as the difference of the measurement using the sensor and a reference. Generating the difference signal can include generating a signal having a frequency that is a difference of frequency of the measurement using the sensor and the reference. The reference can be generated when making the measurement using the sensor.

At 430, the signal is applied to an actuator coupled to the sensor. The actuator perturbs an optical fiber disposed in vicinity of the location, based on the signal, where the optical fiber and the actuator are arranged in proximity to each other. The actuator can be in contact with the optical fiber. Alternatively, the actuator can be at a distance from the optical fiber. The optical fiber can be perturbed in a number of ways. Perturbing the optical fiber can include perturbing a fiber Bragg grating disposed in the optical fiber in vicinity of the location. Perturbing the optical fiber can include perturbing a non-wavelength selective in-line mirror disposed in the optical fiber in vicinity of the location. Perturbing the non-wavelength selective in-line mirror can include perturbing an in-line connector of the optical fiber in vicinity of the location or an in-line reflective material coated fiber splice of the optical fiber in vicinity of the location. Perturbing the optical fiber can include perturbing fiber Bragg gratings placed apart in the optical fiber. Perturbing the optical fiber can include perturbing Fizeau sensor strings in the optical fiber. Applying the signal to the actuator such that that the actuator perturbs the optical fiber can be an analog process. Alternatively, applying the signal to the actuator such that that the actuator perturbs the optical fiber can include encoding digital data onto the optical fiber through vibration or strain of the optical fiber. Encoding digital data onto the optical fiber can include using a phase-shift keying communication scheme. Using the phase-shift keying communication scheme can include using one or more of differential phase shift keying, binary phase shift keying, quad phase shift keying, or quadrature amplitude modulation.

At 440, a value of the parameter is extracted at an interrogator coupled to the optical fiber. Perturbing the optical fiber and extracting the value of the parameter at the interrogator can be conducted in a number of ways. Different arrangements of optical fiber and/or interrogator may be used. The value can be extracted in response to receiving an optical signal backscattered from a perturbed region of the optical fiber. Extracting the value of the parameter can include using an interferometric interrogator. Extracting the value of the parameter at the interrogator can include measuring frequency based on coherent Rayleigh scattering using interferometry, measuring dynamic changes in attenuation, or measuring a dynamic shift of Brillioun frequency. Perturbing the optical fiber and extracting the value of the parameter at the interrogator can include using intrinsic Fabry-Perot interferometers as a mode of interrogation from fiber Bragg gratings placed apart in the optical fiber. Perturbing the optical fiber and extracting the value of the parameter at the interrogator can include using Fizeau sensor strings in the optical fiber. Extracting the value of the parameter at the interrogator can include using a second optical fiber to transmit an optical signal from perturbing the optical fiber to a detection unit of the interrogator.

The above method may include using a number of additional sensors disposed along the length of the optical fiber, each sensor spaced apart from the other sensors of the number of sensors. For selected ones of the number of sensors, the method can include: making a measurement using the respective sensor, the measurement corresponding to the parameter; generating a signal correlated to the parameter in response to the measurement; applying the signal to an actuator coupled to the respective sensor such that that the actuator perturbs the optical fiber, based on the signal, the optical fiber and the actuator arranged in proximity to each other; and extracting a value of the parameter, at the interrogator in response to receiving an optical signal from the perturbed region of the optical fiber. An actuator coupled to its respective sensor can be positioned in contact with the optical fiber. Alternatively, an actuator coupled to its respective sensor can be at a distance from the optical fiber. With respect to the arrangement of a plurality of sensors, perturbing the optical fiber and extracting a value with respect to each respective sensor can include one or more of conducting measurements based on coherent Rayleigh scattering using interferometry, measuring dynamic changes in attenuation, measuring a dynamic shift of Brillioun frequency, using a fiber Bragg grating disposed in the optical fiber in vicinity of a respective sensor, using a non-wavelength selective in-line mirror disposed in the optical fiber in vicinity of the respective sensor, using intrinsic Fabry-Perot interferometers as a mode of interrogation from fiber Bragg gratings placed apart in the optical fiber corresponding to the respective sensors, using Fizeau sensor strings in the optical fiber corresponding to the respective sensors, or using a second optical fiber to transmit an optical signal from perturbing the optical fiber to a detection unit of the interrogator.

Figure 5:
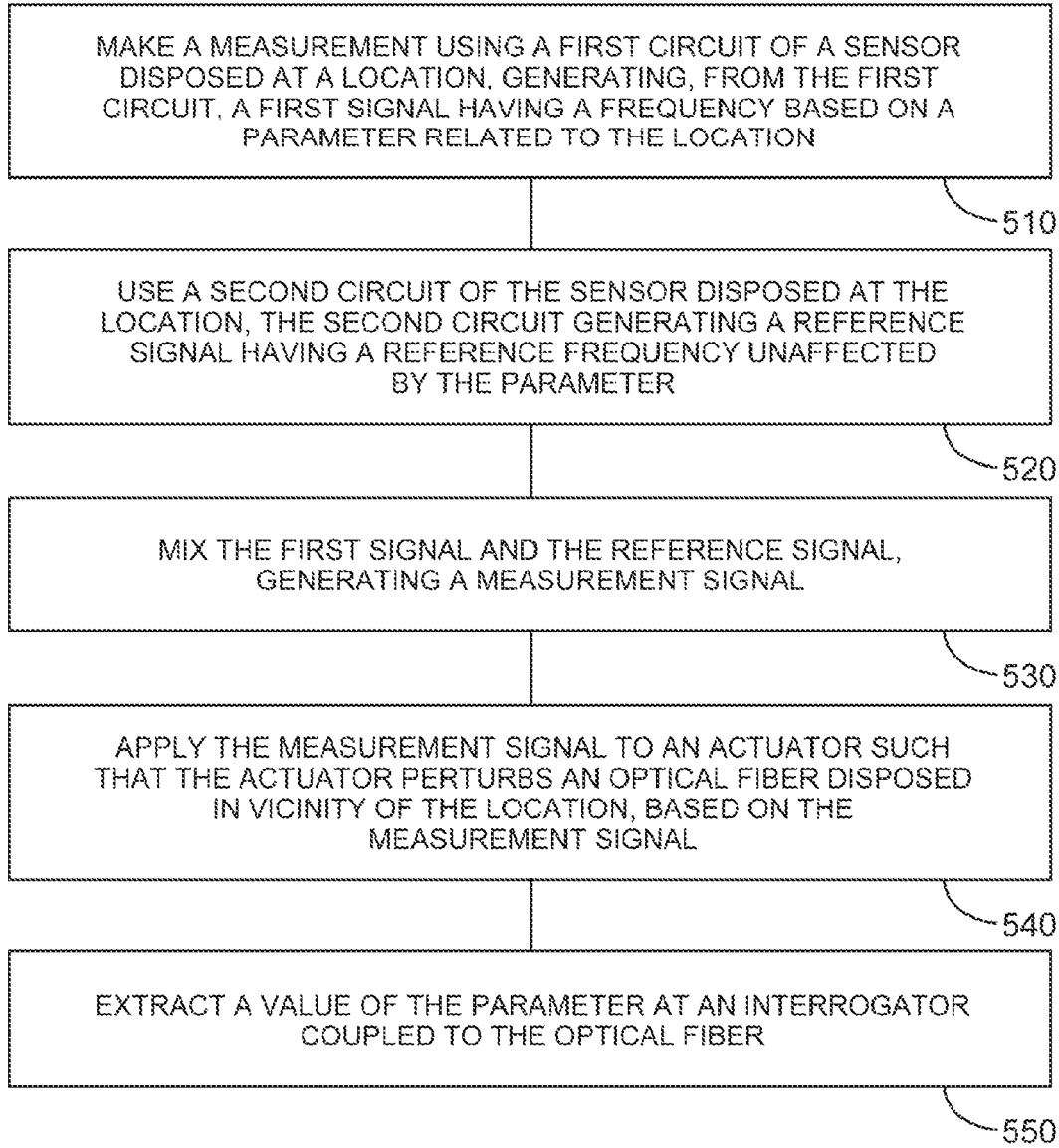
FIG. 5 shows features of an example method to measure parameters of interest using an optical fiber, in accordance with various embodiments.

FIG. 5 shows features of an example embodiment of a method to measure parameters of interest using an optical fiber. At 510, a measurement is made using a first circuit of a sensor disposed at a location, generating, from the first circuit, a first signal having a frequency based on a parameter related to the location. The parameter can include one of a chemical concentration, a pH, a temperature, or a pressure. Making the measurement using the first circuit can include using a circuit having a resonating element that has a complex impedance that changes based on pressure.

At 520, a second circuit of the sensor disposed at the location is used, the second circuit generating a reference signal having a reference frequency unaffected by the parameter. Using the second circuit can include using a circuit having a resonating element that has a complex impedance, the resonating element of the second circuit arranged to be unaffected by the pressure that changes the complex impedance of the resonating element of the first circuit. The resonating element of the first circuit can include a first quartz crystal coupled to pressure external to the sensor such that the first quartz crystal changes frequency based on the external pressure, and the resonating element of the second circuit can include a second quartz crystal not coupled to the external pressure such that the second quartz crystal does not change frequency based on the external pressure. The first circuit and the second circuit may comprise discrete components.

At 530, the first signal and the reference signal are mixed, generating a measurement signal. The measurement signal can have a measurement frequency equal to a difference between the first frequency and the reference frequency. At 540, the measurement signal is applied to an actuator coupled to the sensor such that that the actuator perturbs an optical fiber disposed in vicinity of the location based on the measurement signal. The optical fiber and the actuator can be arranged in proximity to each other.

At 550, a value of the parameter is extracted at an interrogator coupled to the optical fiber. The value of the parameter can be extracted in a number of ways. The parameter can be extracted in response to receiving an optical signal from the perturbed region of the optical fiber. The parameter can be extracted in response to receiving an optical signal backscattered from the perturbed region of the optical fiber. Extracting the value of the parameter at the interrogator can include extracting a characteristic of the measurement signal from the optical signal. Extracting a characteristic of the measurement signal from the backscattered optical signal can include extracting a characteristic of the frequency of the measurement signal from the optical signal. Extracting the value of the parameter at an interrogator can include measuring frequency based on coherent Rayleigh scattering using interferometry. Extracting the value of the parameter at an interrogator for each location of interest can include using one or more of a fiber Bragg grating disposed in the optical fiber in vicinity of a location, a non-wavelength selective in-line mirror disposed in the optical fiber in vicinity of a location, intrinsic Fabry-Perot interferometers as a mode of interrogation from fiber Bragg gratings placed apart in the optical fiber, Fizeau sensor strings in the optical fiber, or a second optical fiber to transmit an optical signal from perturbing the optical fiber to a detection unit of the interrogator.

In the above method, a third quartz crystal can be used to determine temperature at the location. Alternatively, the optical fiber can be used to determine temperature at the location through a distributed temperature sensing measurement. In procedures to determine a parameter at a location, other characteristics of the location or measuring tool at the location may be measured and/or analyzed. The signal from mixing the first signal from the measurement at the location with the reference signal, in the above method, is referred to as the measurement signal, since this signal is used to affect propagation in the optical fiber from which the parameter of interest can be extracted, providing a measurement of the parameter.

In various embodiments, a mechanism to measure parameters of interest indirectly using a fiber optic cable is provided. These parameters can be provided by a process that provides for multiplexed or distributed measurements. A distributed architecture can include acoustic sensor units distributed selectively along an optical fiber such that the acoustic sensor units effectively modulate the optical fiber with information regarding a parameter to provide the information to an interrogator, which can be located at a surface remote from the acoustic sensor units located downhole. The information with respect to downhole conditions can be provided real time to the surface. The parameters that can be measured in a distributed manner include, but are not limited to, temperature, pH, chemical concentration, or other similar parameters that can be transduced providing a signal to be sent over an optical fiber. A pH measurement may be provided through a form of chemical sensing or ion sensing, for example, sodium or calcium or potassium ion sensing locally. The measured parameter may then be encoded into sound to be picked up immediately on an optical fiber, for example with non-contact means.

In various embodiments, an apparatus to measure pressure can include an electrical circuit containing a resonating element (i.e. RLC: resistive-inductive-capacitive, quartz crystal, etc.) that has a complex impedance which changes based on pressure. For example, an oscillator circuit can be structured using discrete components containing an RLC circuit or quartz crystal. Many pressure sensitive capacitors are available commercially, along with pressure sensitive quartz modules. By using any of these pressure sensitive elements in the feedback loop of a circuit, an oscillator can be constructed where the frequency of oscillation is directly proportional to the pressure on the pressure sensing element. Numerous oscillator circuit designs exist, including Wien bridge, Hartley, Pierce, etc. The electrical output of the oscillator can be coupled to another device that mechanically reacts based on the electrical signal. For example, a piezoelectric crystal or voice coil can be used to produce a vibrator or actuator that oscillates at the frequency of the electrical oscillator signal. By coupling the vibration mechanism to a fiber optic cable, a strain will be induced on the fiber that varies with a frequency of oscillation that can be measured by an optical interrogator. A fiber optic cable can be interrogated using a method of distributed interferometry to determine the frequency of oscillation. Power can be supplied directly to the oscillator through an electrical conductor or by indirect means including, but not limited to: a RF antenna, energy harvesting methods, a battery, or other power delivery mechanism, which can include remote optical or electrical powering.

Figure 6A:
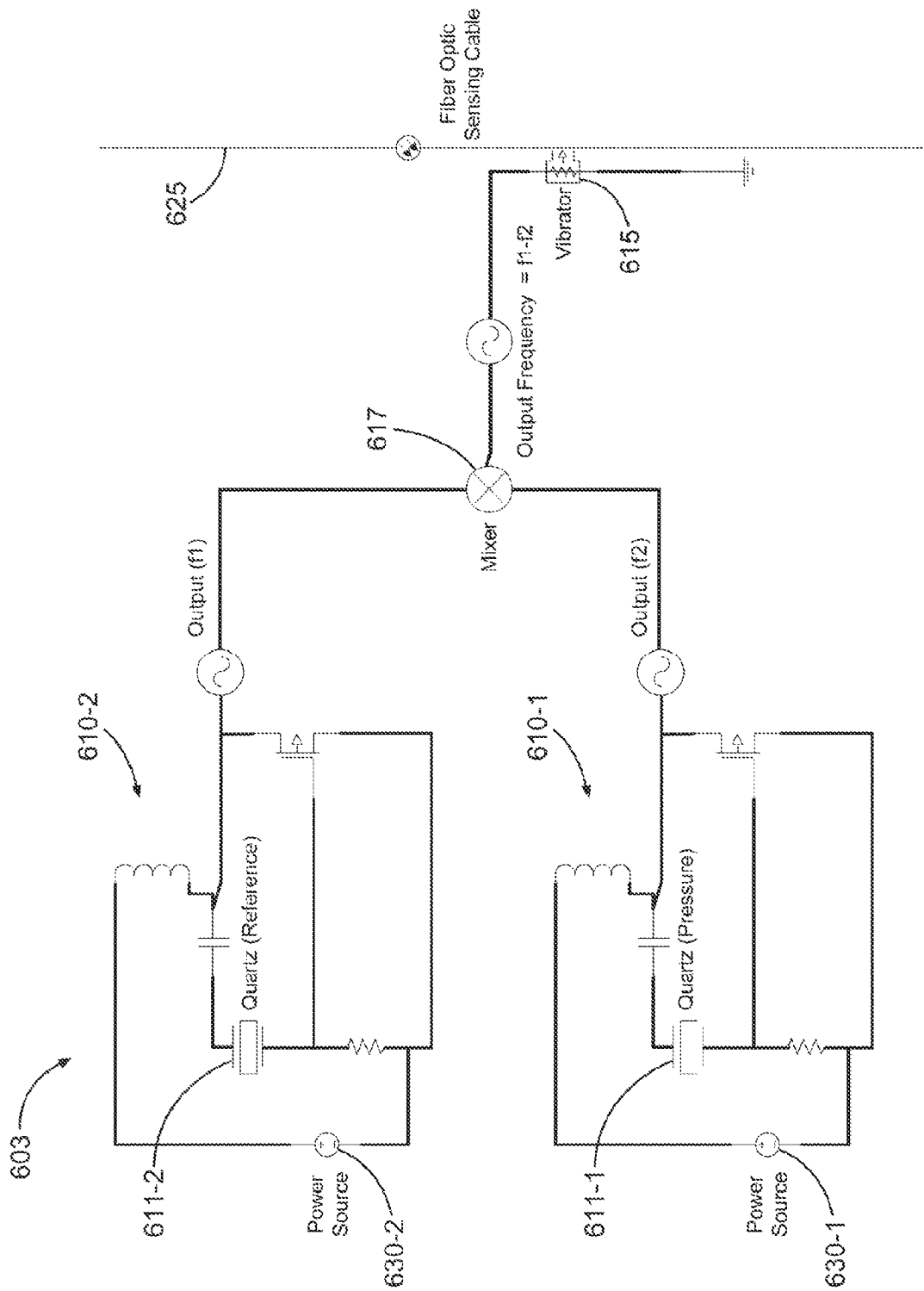
FIG. 6A shows a representation of a sensor unit operable with a fiber optic cable, in accordance with various embodiments.

FIG. 6A shows a representation of a sensor unit 603 operable with a fiber optic cable 625 using an actuator 615. A number of sensor units, similar to or identical to the sensor unit 603, can be distributed along the fiber optic cable forming a multiplexed sensor system or a distributed sensor system. The sensor unit 603 can include two oscillators 610-1, 610-2 with a quartz crystal 611-1, 611-2 in each oscillator 610-1, 610-2, respectively, controlling the frequency of oscillation. The sensor unit 603 can include power sources 630-1 and 630-2. One of the quartz crystals, quartz crystal 611-1, can be coupled to external pressure and changes frequency based on this pressure. For example, a diaphragm can be directly coupled to quartz crystal 611-1. The other quartz crystal, quartz crystal 611-2, is not coupled to external pressure and changes frequency only due to a small drift over long time periods inherent in quartz oscillators. Similar changes in frequency due to a small drift over long time periods can also occur for quartz crystal 611-2. The typical quartz crystal has a resonant frequency in the megahertz range.

To reduce the frequency of oscillation to a bandwidth that can be recorded by an optical interrogator, a mixer 617 can be used to provide the difference frequency between these two oscillators. However, arrangements other than using a mixer can be realized. Other operations can be performed to shift and scale (down-convert) the naturally high crystal frequencies into a baseband low frequency that can be used in a frequency range with an interrogator for distributed acoustic sensing (DAS) or with a distributed vibration sensor (DVS). For example, frequency-counting or frequency division can be implemented. Crystals may be fabricated such that the difference oscillation between them can be between 100 Hz and 10 kHz over the operating temperature range and pressure range to be measured. Using an oscillator as the sensing element can provide an important simplification compared to the traditional approach of using digital electronics to sense a parameter and to communicate the sensed data to the surface. The digital approach requires an analog-to-digital converter to transduce the sensed parameter into digital data, where the digitized sensor data is transmitted using a digital communication scheme. A circuit using discrete components, as in FIG. 6A, can be designed for much higher reliability and operating temperature compared with a digital electronics approach.

Figure 6B:
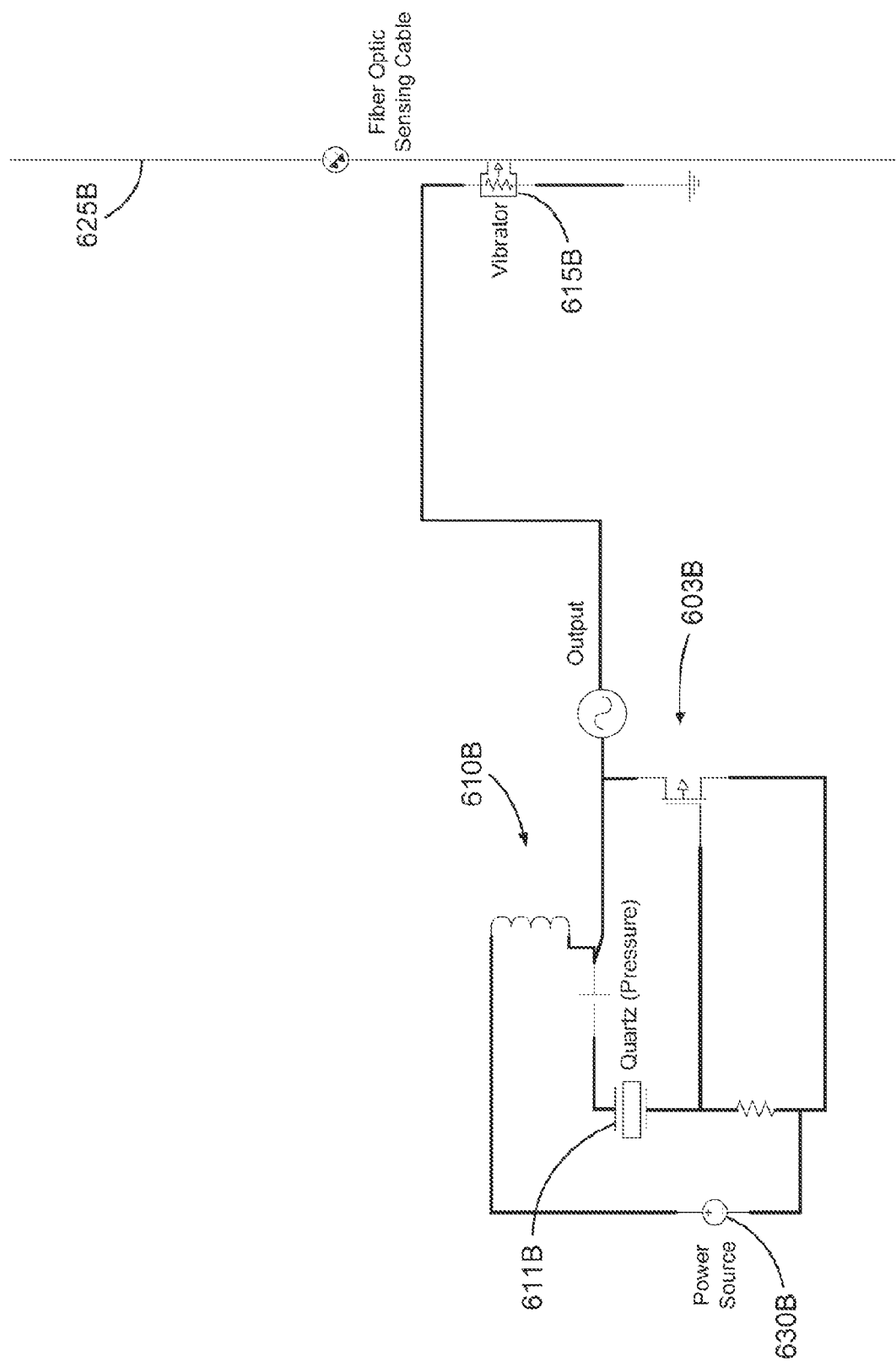
FIG. 6B shows a representation of a sensor unit operable with a fiber optic cable, in accordance with various embodiments.

FIG. 6B shows an example representation of a sensor unit 603B operable with a fiber optic cable 625B using an actuator 615B. This representation shows an example of a sensor unit that does not include a mixer unit, such as shown in FIG. 6A. A number of sensor units, similar to or identical to the sensor unit 603B, can be distributed along the fiber optic cable 625B forming a multiplexed sensor system or a distributed sensor system. The sensor unit 603B can include an oscillator 610B with a sensor element 611B. The sensor unit 603 can also include a power source 630B. Sensor element 611B can be coupled to external pressure such that a characteristic of sensor element 611B changes based on this pressure, which can result in a change in the output of sensor unit 603B. The change in the output of sensor unit 603B can be a change in frequency. The sensor element 611B can be a quartz crystal controlling the frequency of oscillation for output from the oscillator 610B to the actuator 615B, which may be a vibrator. In FIG. 6B, a downhole arrangement of a crystal oscillator may provide an alternative arrangement to down-converting crystal frequencies between a reference transducer and a sensing transducer.

The quartz crystal can be selected such that each quartz oscillator, among a set of sensor units distributed along a path to which the fiber optic cable 625B can be arranged, can transmit its specific baseband tonal frequency to the fiber optic cable 625B at that specific location via the same exciter, such as a vibrator, or separate exciters. The path may be a downhole path at a gas/oil production site. Such an arrangement may help simplify downhole circuitry and may aid in transduction linearity. In an embodiment, a DAS/DVS interrogator, coupled to the fiber optic cable 625B, can be arranged to discern individual tones in the demodulated frequency domain for subsequent differencing/comparison at the surface. Crystal oscillators can be made to naturally operate in a baseband frequency range within the sampling frequency of a surface interrogator. Also, circuit using discrete components, as in FIG. 6B, can be designed for much higher reliability and operating temperature compared with a digital electronics approach.

A typical quartz pressure gauge design usually has a third crystal which is used as a temperature sensor to provide temperature information for calibrating the pressure measurement. Such a third crystal can be incorporated in sensor unit 603. Alternatively, if slightly degraded pressure accuracy is acceptable, the third quartz crystal could be omitted and instead the fiber optic cable 625 can provide temperature through a DTS measurement.

Figure 7:
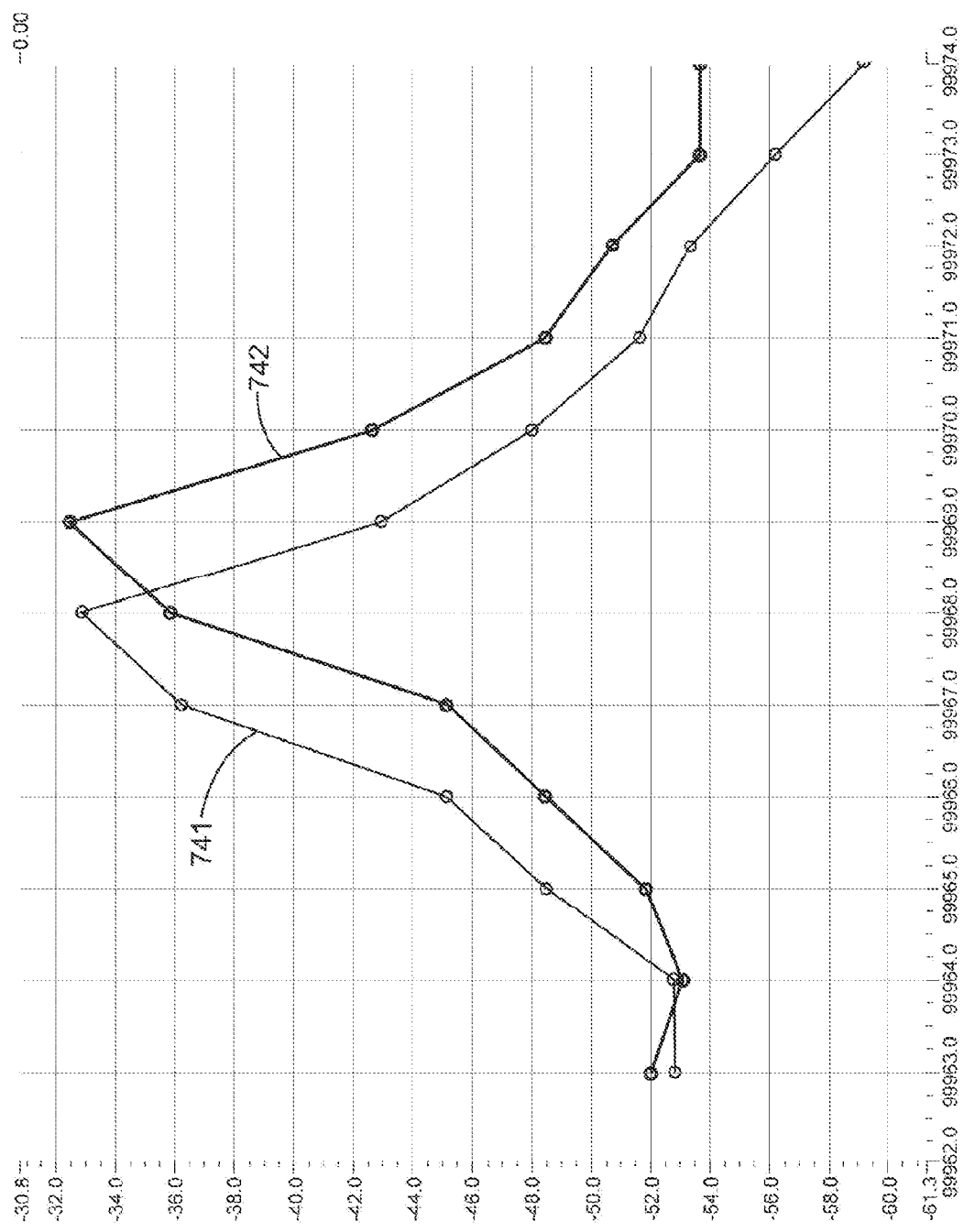
FIG. 7 shows the results of a test using an actuator and an interferometric interrogator, in accordance with various embodiments.

To make a precise, high resolution pressure measurement using the fiber optic cable, a fiber interrogation method that can resolve narrow frequency differences can be used. For example, to achieve a dynamic range of 10,000 PSI and desired pressure resolution of 0.1 PSI, a frequency resolution of 10 mHz at 1 kHz would be required. Based on lab tests, such resolution is possible, for example, using a coherent Rayleigh interrogator. FIG. 7 shows test results using an actuator and an interferometric interrogator. The test apparatus included a laser with a repetition rate at 20 kHz, a voice coil on table with a coil of fiber a few inches away, a function generator to drive the voice coil at 1000.00 Hz and 1000.01 Hz. The testing included 100 seconds of data collected at each frequency. Performing a fast Fourier transform (FFT) of the data collected at each frequency gives a spectrum with bins of 0.01 Hz spacing. These results confirm that distributed acoustic sensing (DAS) can resolve frequencies down to at least 0.01 Hz resolution. FIG. 7 shows curve 741 from 1000.00 Hz data and curve 742 from 1000.01 Hz data. The two peaks can be resolved and are spaced 0.01 Hz apart in the FFT. Although coherent Rayleigh scattering in an optical fiber was used in this test for interrogating the fiber to measure the frequency, other methods applicable to field use can be used. Examples of other methods include, but are not limited to, measuring dynamic changes in attenuation or measuring the dynamic shift of Brillioun frequency peaks, which are directly related to strain on the fiber optic cable.

In various embodiments, a fiber optic cable can be interrogated using a method of distributed interferometry to determine a parameter of interest, such as but not limited to pressure, at a location. The distributed interferometry can be realized as fiber optic distributed strain sensing based on Rayleigh scattering. Such a method can be used to determine a frequency of oscillation of the strain, from which a value of the parameter of interest can be determined Rayleigh scattering is the scattering of electromagnetic radiation by particles significantly smaller than the wavelength of the electromagnetic radiation, which for example can result in light scattering from random inhomogeneities in an optic fiber. An optical pulse propagating in an optical fiber is reflected back from locations along the length of the optical fiber. A perturbation of the optical fiber at a location along the optical fiber, such as a vibration or a strain induced in the location, changes the backscattered light at that location. Detecting the modification of the optical fiber from detecting the backscattered light, the parameter of interest that is the source of the perturbation can be evaluated.

In an interrogator based on Rayleigh scattering in optical fiber, a short optical pulse can be injected into an optical fiber and the Rayleigh backscatter from one or more regions of induced strain in the optical fiber can be examined, providing distributed strain sensing. Sensors along the optical fiber can provide an induced vibration or strain in a region of the optical fiber correlated with the location of the sensor. Each sensing region along the fiber can be evaluated independently. A number of different detection architectures can be used to provide an interrogator.

Figure 8:
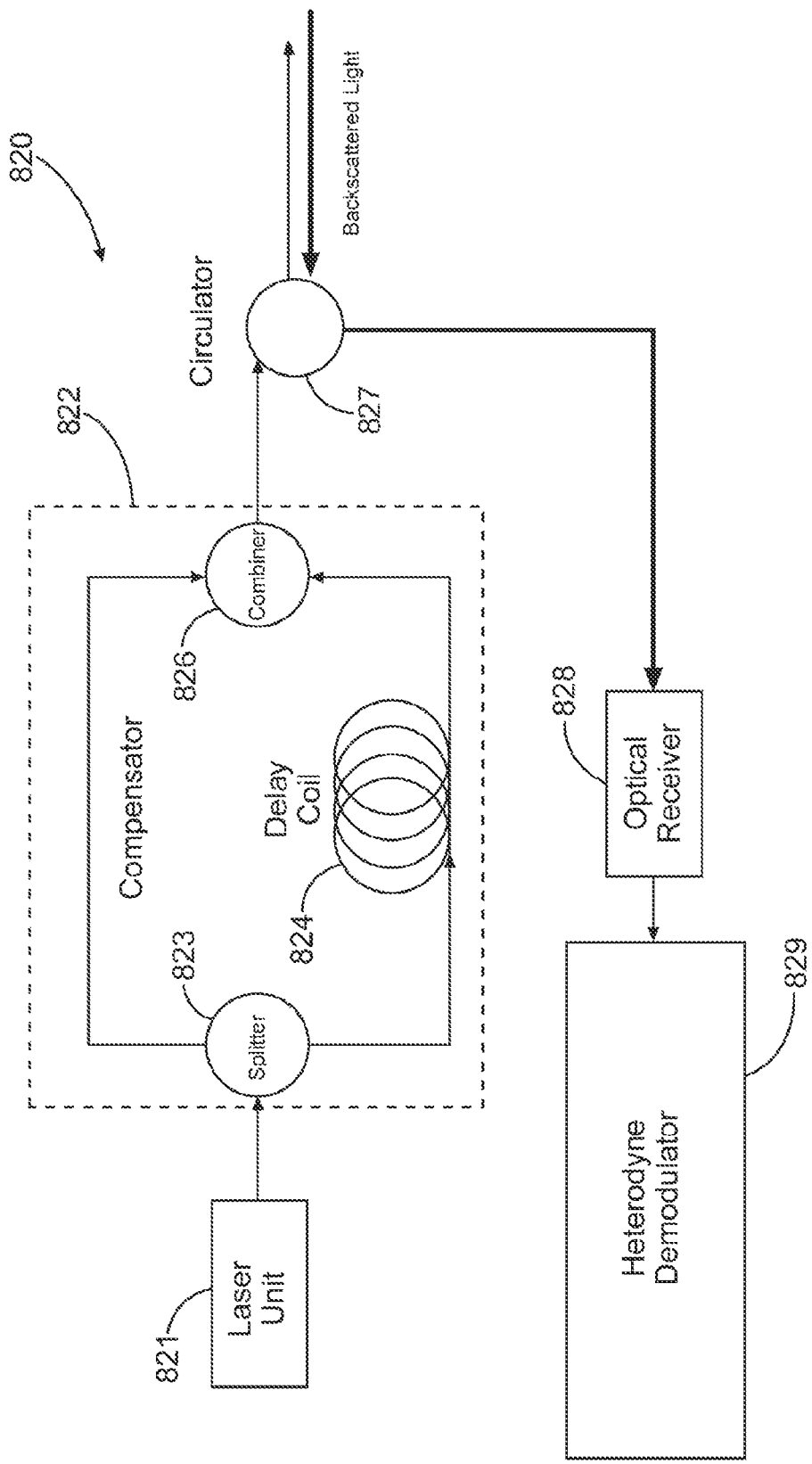
FIG. 8 shows an example of a Mach-Zehnder interferometric arrangement that is one of a number of arrangements that can be used for multiplexed or distributing sensing, in accordance with various embodiments.

FIG. 8 shows a non-limiting example of a Mach-Zehnder interferometric arrangement 820 that can be used for distributing sensing of Rayleigh backscattered light. The Mach-Zehnder interferometric arrangement 820 can include a laser unit 821 that provides a source of optical pulse(s) to be injected into an optical fiber. The laser unit 821 can be realized in a number of different configurations. In addition to a laser source, the laser unit 821 may include a pulse shaper and/or amplifier to provide a desired source optical pulse(s). For an optical fiber of one kilometer, the repetition rate of the laser unit 821 can be driven up to 100 kHz. The laser unit 821 provides light to a compensator 822 at a splitter 823 that splits the light into two paths to a combiner 826. One path includes a delay coil 824, while the other path does not include such a delay mechanism. Light from the combiner 826 is directed to a circulator 827 from which the light injected into an optical fiber and where backscattered light from the optical fiber is received at the circulator 827. The received backscattered light is directed from the circulator 827 to an optical receiver 828 that provides the backscattered light to a heterodyne demodulator 829, which can be used in extracting characteristics of a perturbation on the optical fiber.

Figure 9:
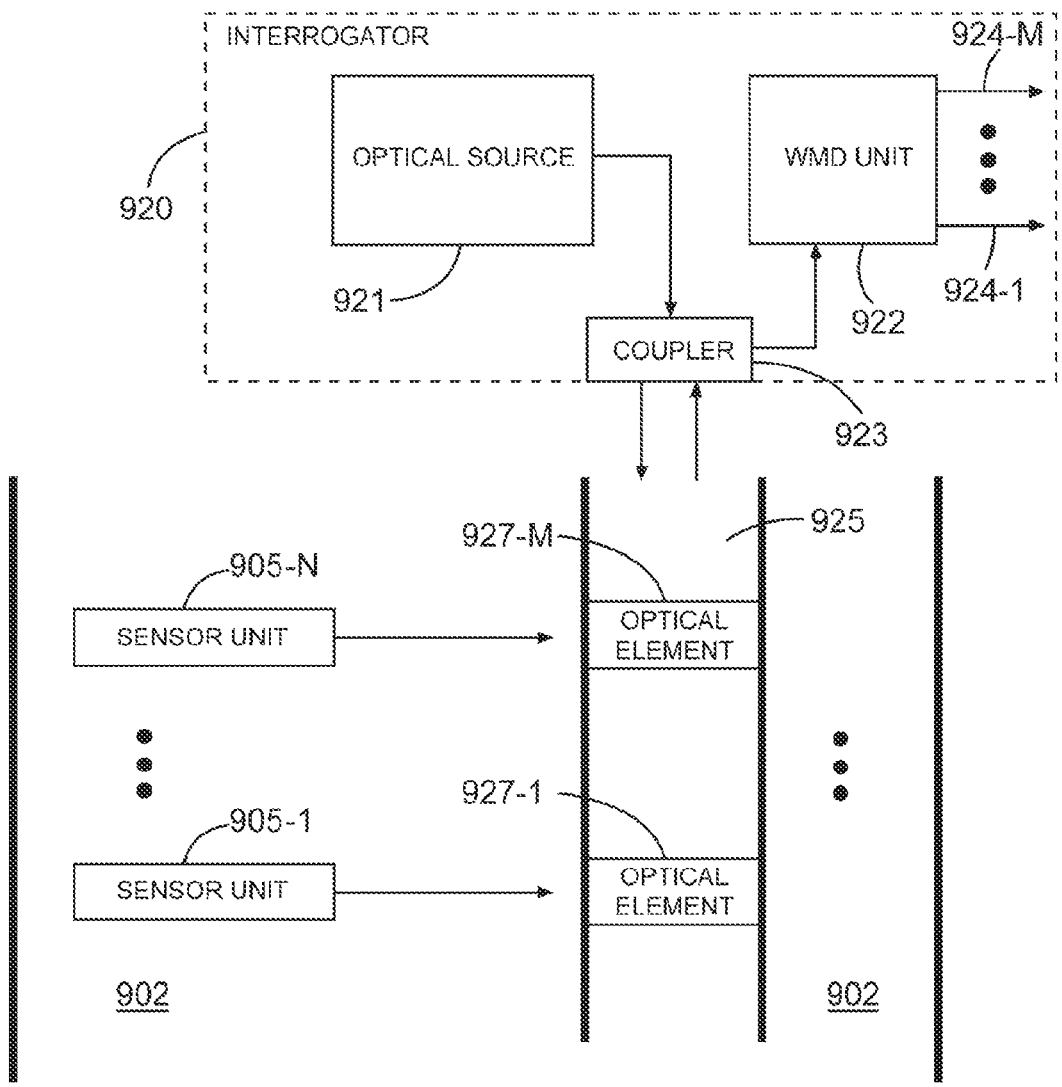
FIG. 9 shows example features of an arrangement of an optical fiber with a number of sensor units to provide measurements along a direction in a region, in accordance with various embodiments.

Sensors as taught herein can be used with a number of different optical fiber arrangements in addition to arrangements that use distributing sensing of Rayleigh backscattered light. FIG. 9 shows example features of an arrangement of an optical fiber 925 with a number of sensor units 905-1 . . . 905-N to provide measurements along a direction in a region 902. The sensor units 905-1 . . . 905-N can be arranged such these sensors are disposed at a location in proximity of the optical fiber 925. The sensor units 905-1 . . . 905-N and optical fiber 925 can be located downhole at a drilling site with the interrogator 920 at the surface of the drilling site. The sensor units 905-1 . . . 905-N may be fixed and optical fiber moveable with respect to these sensor units. The optical fiber 925 may be fixed and sensor units 905-1 . . . 905-N moveable with respect to the optical fiber 925. The sensor units 905-1 . . . 905-N and the optical fiber 925 may be fixed with respect to each other. The drilling site may be terrestrial or sea-based. The sensor units 905-1 . . . 905-N and optical fiber 925 may be disposed outside casing in cement or strapped to a production tube in a permanent installation. The sensor units 905-1 . . . 905-N and optical fiber 925 may be disposed in a coiled tubing that can be pushed through into a horizontal area of operation. The sensor units 905-1 . . . 905-N and optical fiber 925 may be structured in other drilling related arrangements.

Each sensor unit of sensor units 905-1 . . . 905-N can include a sensor, a circuit, and an actuator similar to or identical to arrangements of such components as taught herein. Each sensor unit 905-1 . . . 905-N can provide a signal to optical fiber 925 that is representative of the parameter measured by the respective sensor unit 905-1 . . . 905-N. The signal, provided by direct contact or by being generated in vicinity of the optical fiber 925, can act as a perturbation on optical elements 927-1 . . . 927-M. The sensing of this perturbation with respect to optical fiber 925 and its components can be used to extract data corresponding to the measurement of the respective sensor unit 905-1 . . . 905-N. Though there may be a one to one relationship between the number of sensor units and the number of optical elements such that N=M, other relationships can be used. For example with sensor units 905-1 . . . 905-N fixed having N>1, the optical fiber 925, placed into region 902, can have more or less than N optical elements. With N=1, the number of optical elements can be equal to or greater than one. In an embodiment, M may equal one or a number less than N such that measurements may be made relative to respective sensor units 905-1 . . . 905-N in a drilling hole as the optical elements 927-1 . . . 927-M are lowered in vicinity of each respective one of sensor units 905-1 . . . 905-N or as the sensor units 905-1 . . . 905-N are lowered in vicinity of each respective one of optical elements 927-1 . . . 927-M.

Each of optical elements 927-1 . . . 927-M may be structured as a fiber Bragg grating (FBG). The optical elements 927-1 . . . 927-M perturbed by a signal from a sensor unit of the sensor unit 905-1 . . . 905-M in vicinity of respective optical elements 927-1 . . . 927-M can be interrogated by an interrogator 920. Interrogator 920 can include an optical source 921, a coupler 923, and a wavelength division multiplexing (WDM) unit 922. Light from optical source 921 can be coupled to optical fiber 925 using coupler 923. Optical source 921 can be a broadband source. The light can interact with optical elements 927-1 . . . 927-M that may be affected by a signal from a corresponding sensor of sensor units 905-1 . . . 905-N. Light operated on by the optical elements 927-1 . . . 927-M, including any perturbations from sensor units 905-1 . . . 905-N, propagates to interrogator 920, where such light can be directed to WDM unit 922 via the coupler 923. WDM unit 922 may be realized as one or more of a number of different structural devices. WDM unit 922 may be arranged as an apparatus that includes an optical spectrum analyzer. WDM unit 922 may be arranged as an apparatus that includes a wavelength division demultiplexer that separates the received light into M wavelength components and places each component onto a respective one of outputs 924-1 . . . 924-M for further processing. Such an arrangement can provide a WDM sensing scheme to the measurements provided by sensor units 905-1 . . . 905-N.

Figure 10:
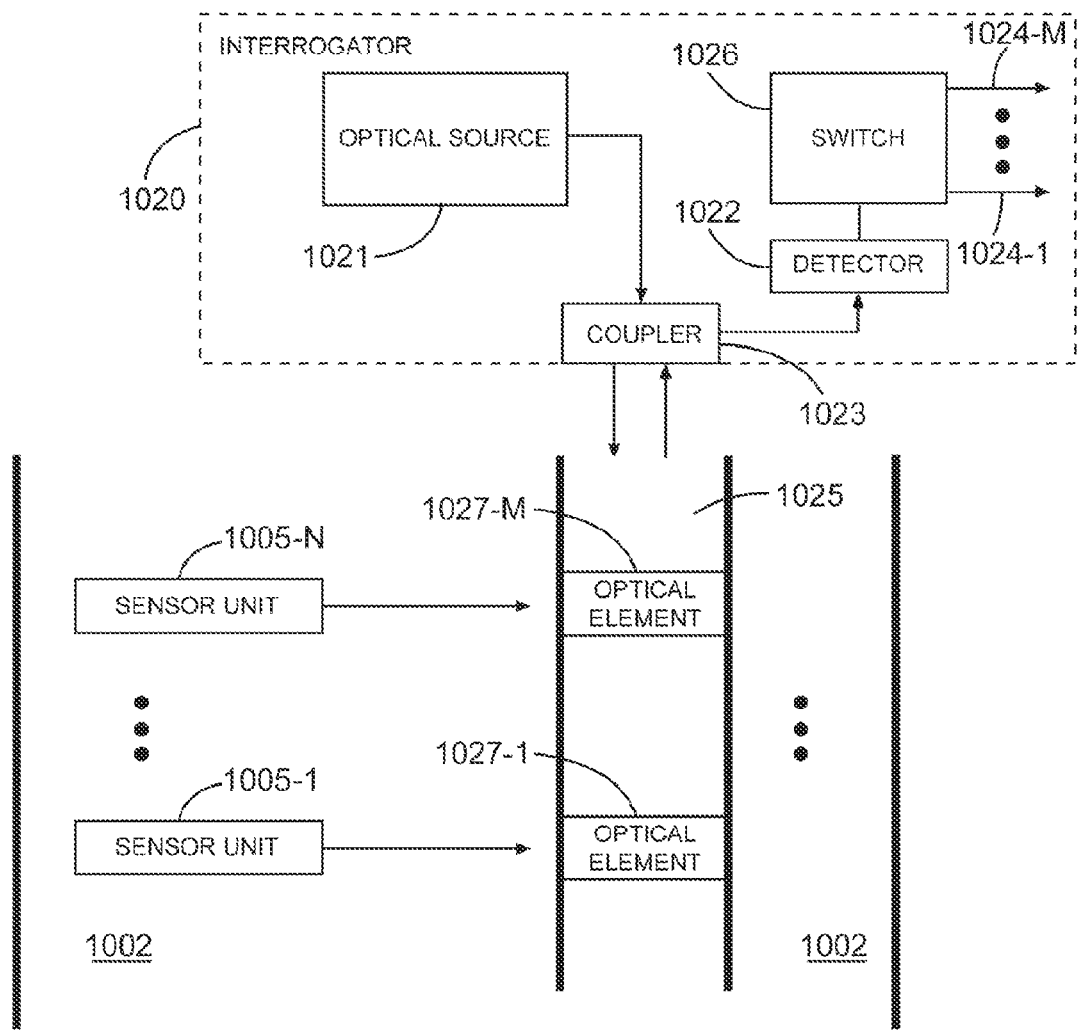
FIG. 10 shows example features of an arrangement of an optical fiber with a number of sensor units to provide measurements along a direction in a region, in accordance with various embodiments.

FIG. 10 shows example features of an arrangement of an optical fiber 1025 with a number of sensor units 1005-1 . . . 1005-N to provide measurements along a direction in a region 1002. The sensor units 1005-1 . . . 1005-N can be arranged such these sensors are disposed at a location in proximity of the optical fiber 1025. The sensor units 1005-1 . . . 1005-N and optical fiber 1025 can be located downhole at a drilling site with the interrogator 1020 at the surface of the drilling site. The sensor units 1005-1 . . . 1005-N may be fixed and optical fiber moveable with respect to these sensor units. The optical fiber 1025 may be fixed and sensor units 1005-1 . . . 1005-N moveable with respect to the optical fiber 1025. The sensor units 1005-1 . . . 1005-N and the optical fiber 1025 may be fixed with respect to each other. The drilling site may be terrestrial or sea-based. The sensor units 1005-1 . . . 1005-N and optical fiber 1025 may be disposed outside casing in cement or strapped to a production tube in a permanent installation. The sensor units 1005-1 . . . 1005-N and optical fiber 1025 may be disposed in a coiled tubing that can be pushed through into a horizontal area of operation. The sensor units 1005-1 . . . 1005-N and optical fiber 1025 may be structured in other drilling related arrangements.

Each sensor unit of sensor units 1005-1 . . . 1005-N can include a sensor, a circuit, and an actuator similar to or identical to arrangements of such components as taught herein. Each sensor unit 1005-1 . . . 1005-N can provide a signal to optical fiber 1025 that is representative of the parameter measured by the respective sensor unit 1005-1 . . . 1005-N. The signal, provided by direct contact or by being generated in vicinity of the optical fiber 1025, can act as a perturbation on optical elements 1027-1 . . . 1027-M. The sensing of this perturbation with respect to optical fiber 1025 and its components can be used to extract data corresponding to the measurement of the respective sensor unit 1005-1 . . . 1005-N. Though there may be a one to one relationship between the number of sensor units and the number of optical elements such that N=M, other relationships can be used. For example with sensor units 1005-1 . . . 1005-N fixed having N>1, the optical fiber 1025, placed into region 1002, can have more or less than N optical elements. With N=1, the number of optical elements can be equal to or greater than one. In an embodiment, M may equal one or a number less than N such that measurements may be made relative to respective sensor units 1005-1 . . . 1005-N in a drilling hole as the optical elements 1027-1 . . . 1027-M are lowered in vicinity of each respective one of sensor units 1005-1 . . . 1005-N or as the sensor units 1005-1 . . . 1005-N are lowered in vicinity of each respective one of optical elements 1027-1 . . . 1027-M.

Each of optical elements 1027-1 . . . 1027-M may be structured as a FBG. Alternatively, each of optical elements 1027-1 . . . 1027-M may be structured as a partially reflective (low reflectivity) in-line mirror to parse the segments of the optical fiber 1025 or channels along a fiber sensing length of the optical fiber 1025. Such non-wavelength selective low reflectivity mirrors can be realized as in-line connectors or as in-line reflective material coated fiber splices. An example of such coatings includes titanium dioxide reflective coatings.

The optical elements 1027-1 . . . 1027-M perturbed by a signal from a sensor unit of the sensor unit 1005-1 . . . 1005-M in vicinity of respective optical elements 1027-1 . . . 1027-M can be interrogated by an interrogator 1020. Interrogator 1020 can include an optical source 1021, a coupler 1023, a detector 1022, and a switch 1026. Light from optical source 1021 can be coupled to optical fiber 1025 using coupler 1023. Optical source 1021 can be structured to selectively provide pulses of light to the optical fiber 1025. The light can interact with optical elements 1027-1 . . . 1027-M that may be affected by a signal from a corresponding sensor of sensor units 1005-1 . . . 1005-N. Light operated on by the optical elements 1027-1 . . . 1027-M, including any perturbations from sensor units 1005-1 . . . 1005-N propagates to interrogator 1020, where such light can be directed to detector 1022 via the coupler 1023. The output of detector 1022 can be analyzed based on the time differences associated with light from different ones of the optical elements 1027-1 . . . 1027-M. Optionally, output from the detector 1022 may be directed to a switch 1026, which can separate the detected light into M time components and place each time-based component onto a respective one of outputs 1024-1 . . . 1024-M for further processing. Such an arrangement can provide a time division multiplexed (TDM) sensing scheme to the measurements provided by sensor units 1005-1 . . . 1005-N.

Figure 11:
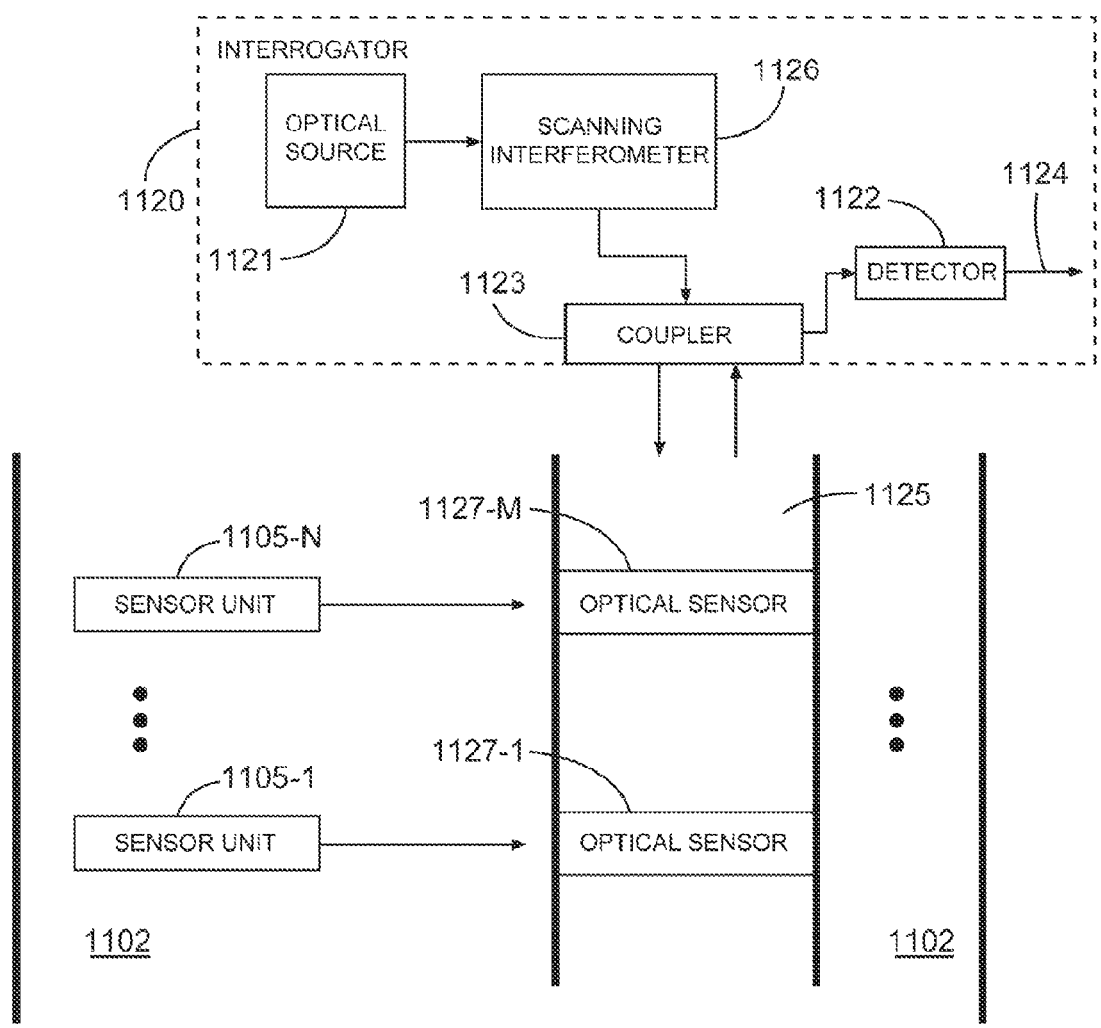
FIG. 11 shows example features of an arrangement of an optical fiber with a number of sensor units to provide measurements along a direction in a region, in accordance with various embodiments.

FIG. 11 shows example features of an arrangement of an optical fiber 1125 with a number of sensor units 1105-1 . . . 1105-N to provide measurements along a direction in a region 1102. The sensor units 1105-1 . . . 1105-N can be arranged such these sensors are disposed at a location in proximity of the optical fiber 1125. The sensor units 1105-1 . . . 1105-N and optical fiber 1125 can be located downhole at a drilling site with the interrogator 1120 at the surface of the drilling site. The sensor units 1105-1 . . . 1105-N may be fixed and optical fiber moveable with respect to these sensor units. The optical fiber 1125 may be fixed and sensor units 1105-1 . . . 1105-N moveable with respect to the optical fiber 1125. The sensor units 1105-1 . . . 1105-N and the optical fiber 1125 may be fixed with respect to each other. The drilling site may be terrestrial or sea-based. The sensor units 1105-1 . . . 1105-N and optical fiber 1125 may be disposed outside casing in cement or strapped to a production tube in a permanent installation. The sensor units 1105-1 . . . 1105-N and optical fiber 1125 may be disposed in a coiled tubing that can be pushed through into a horizontal area of operation. The sensor units 1105-1 . . . 1105-N and optical fiber 1125 may be structured in other drilling related arrangements.

Each sensor unit of sensor units 1105-1 . . . 1105-N can include a sensor, a circuit, and an actuator similar to or identical to arrangements of such components as taught herein. Each sensor unit 1105-1 . . . 1105-N can provide a signal to optical fiber 1125 that is representative of the parameter measured by the respective sensor unit 1105-1 . . . 1105-N. The signal, provided by direct contact or by being generated in vicinity of the optical fiber 1125, can act as a perturbation on optical elements 1127-1 . . . 1127-M. The sensing of this perturbation with respect to optical fiber 1125 and its components can be used to extract data corresponding to the measurement of the respective sensor unit 1105-1 . . . 1105-N. Though there may be a one to one relationship between the number of sensor units and the number of optical elements such that N=M, other relationships can be used. For example with sensor units 1105-1 . . . 1105-N fixed having N>1, the optical fiber 1125, placed into region 1102, can have more or less than N optical elements. With N=1, the number of optical elements can be equal to or greater than one. In an embodiment, M may equal one or a number less than N such that measurements may be made relative to respective sensor units 1105-1 . . . 1105-N in a drilling hole as the optical elements 1127-1 . . . 1127-M are lowered in vicinity of each respective one of sensor units 1105-1 . . . 1105-N or as the sensor units 1105-1 . . . 1105-N are lowered in vicinity of each respective one of optical elements 1127-1 . . . 1127-M.

Each of optical elements 1127-1 . . . 1127-M may be structured as an intrinsic Fabry-Perot interferometer (IFPI). Such interferometers can be arranged as a mode of interrogation from FBGs placed part in the optical fiber 1125. Alternatively, each of optical elements 1127-1 . . . 1127-M may be structured as Fizeau sensors in the optical fiber 1125.

The IFPIs may be arranged as IFPI strings, and the Fizeau sensors may be arranged as Fizeau sensor strings.

The optical elements 1127-1 . . . 1127-M perturbed by a signal from a sensor unit of the sensor unit 1105-1 . . . 1105-M in vicinity of respective optical elements 1127-1 . . . 1127-M can be interrogated by an interrogator 1120. Interrogator 1120 can include an optical source 1121, a scanning interferometer 1126, a coupler 1123, and a detector 1122. Light from scanning interferometer 1126 can be coupled to optical fiber 1125 using coupler 1123. The light can interact with optical elements 1127-1 . . . 1127-M that may be affected by a signal from a corresponding sensor of sensor units 1105-1 . . . 1105-N. Light operated on by the optical elements 1127-1 . . . 1127-M, including any perturbations from sensor units 1105-1 . . . 1105-N propagates to interrogator 1120, where such light can be directed to detector 1122 via the coupler 1123. A signal from an output 1124 of detector 1122 can be analyzed for further processing.

Figure 12:
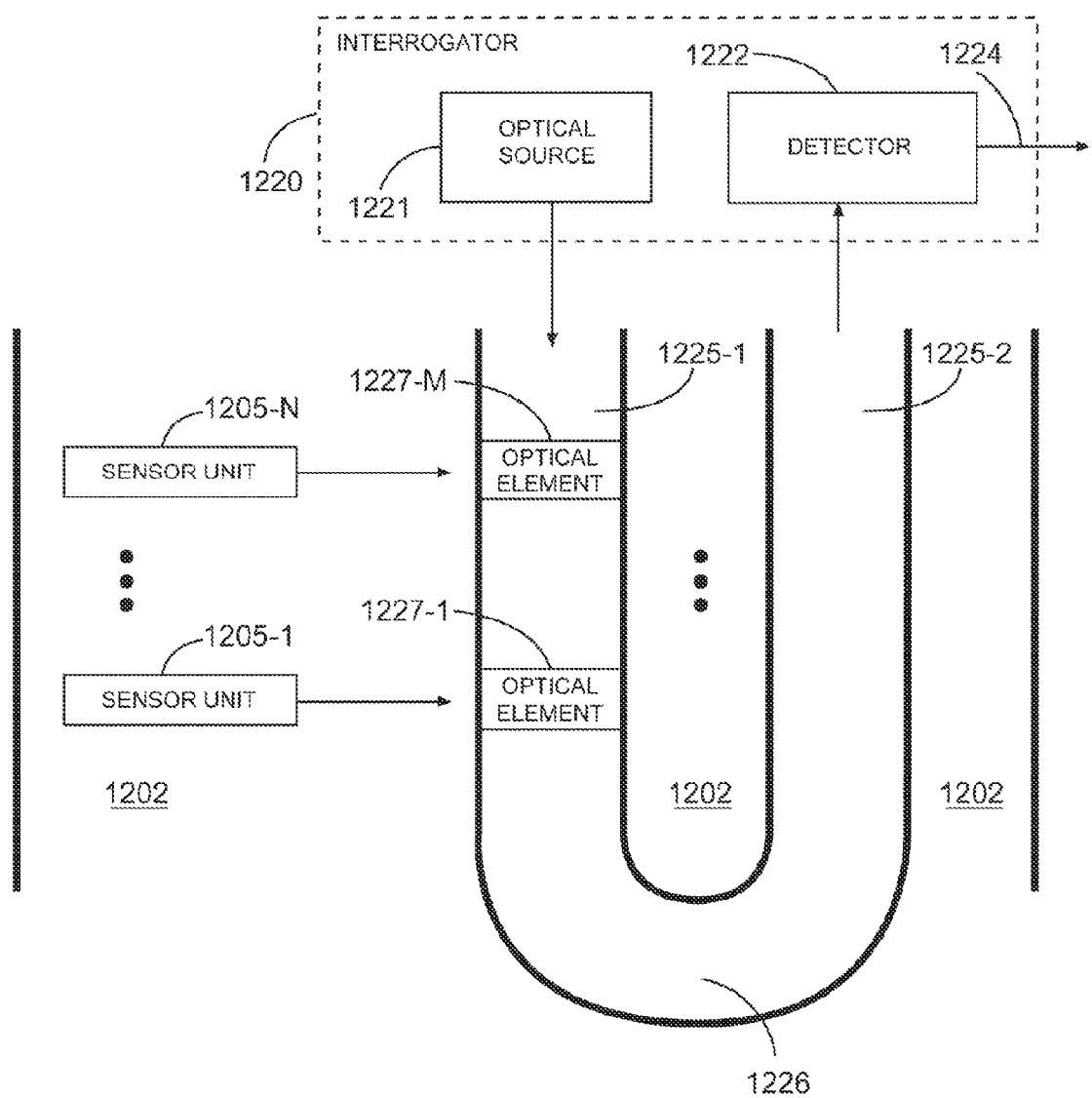
FIG. 12 shows example features of an arrangement of an optical fiber with a number of sensor units to provide measurements along a direction in a region, in accordance with various embodiments.

FIG. 12 shows example features of an arrangement of an optical fiber 1225-1 with a number of sensor units 1205-1 . . . 1205-N to provide measurements along a direction in a region 1202. The sensor units 1205-1 . . . 1205-N can be arranged such these sensors are disposed at a location in proximity of the optical fiber 1225-1. The sensor units 1205-1 . . . 1205-N and optical fiber 1225-1 can be located downhole at a drilling site with the interrogator 1220 at the surface of the drilling site. The sensor units 1205-1 . . . 1205-N may be fixed and optical fiber 1225-1 moveable with respect to these sensor units. The optical fiber 1225-1 may be fixed and sensor units 1205-1 . . . 1205-N moveable with respect to the optical fiber 1225-1. The sensor units 1205-1 . . . 1205-N and the optical fiber 1225-1 may be fixed with respect to each other. The drilling site may be terrestrial or sea-based. The sensor units 1205-1 . . . 1205-N and optical fiber 1225-1 may be disposed outside casing in cement or strapped to a production tube in a permanent installation. The sensor units 1205-1 . . . 1205-N and optical fiber 1225-1 may be disposed in a coiled tubing that can be pushed through into a horizontal area of operation. The sensor units 1205-1 . . . 1205-N and optical fiber 1225-1 may be structured in other drilling related arrangements.

Each sensor unit of sensor units 1205-1 . . . 1205-N can include a sensor, a circuit, and an actuator similar to or identical to arrangements of such components as taught herein. Each sensor unit 1205-1 . . . 1205-N can provide a signal to optical fiber 1225-1 that is representative of the parameter measured by the respective sensor unit 1205-1 . . . 1205-N. The signal, provided by direct contact or by being generated in vicinity of the optical fiber 1225, can act as a perturbation on optical elements 1227-1 . . . 1227-M. The sensing of this perturbation with respect to optical fiber 1225-1 and its components can be used to extract data corresponding to the measurement of the respective sensor unit 1205-1 . . . 1205-N. Though there may be a one to one relationship between the number of sensor units and the number of optical elements such that N=M, other relationships can be used. For example with sensor units 1205-1 . . . 1205-N fixed having N>1, the optical fiber 1225-1, placed into region 1202, can have more or less than N optical elements. With N=1, the number of optical elements can be equal to or greater than one. In an embodiment, M may equal one or a number less than N such that measurements may be made relative to respective sensor units 1205-1 . . . 1205-N in a drilling hole as the optical elements 1227-1 . . . 1227-M are lowered in vicinity of each respective one of sensor units 1205-1 . . . 1205-N or as the sensor units 1205-1 . . . 1205-N are lowered in vicinity of each respective one of optical elements 1227-1 . . . 1227-M.

The optical elements 1227-1 . . . 1227-M perturbed by a signal from a sensor unit of the sensor unit 1205-1 . . . 1205-M in vicinity of respective optical elements 1227-1 . . . 1227-M can be interrogated by an interrogator 1220. Interrogator 1220 can include an optical source 1221 and a detector 1222. Light from optical source 1221 can be coupled to optical fiber 1225-1. Though not shown, a coupler may be used to inject the light into the optical fiber 1225-1. Though not shown, a coupler may be used to direct the light from an optical fiber 1225-2 to the detector 1222. The light can interact with optical elements 1227-1 . . . 1227-M that may be affected by a signal from a corresponding sensor of sensor units 1205-1 . . . 1205-N. In some of the previously discussed embodiments, a serial optical circuit to provide measurement values from one or more sensing units to an interrogator used at least one optical fiber in a reflective approach for sensor multiplexing to provide data from the sensing units. In the example of FIG. 12, a parallel optical circuit can include the two fibers 1225-1 and 1225-2 forming a loop in a transmissive approach for sensor multiplexing to provide data from sensing units. The two fibers 1225-1 and 1225-2 as sections of an optical fiber may be referred to as trunk fibers or fiber trunks. The optical elements 1227-1 . . . 1227-M may be sections of the optical fiber 1225-1, where these regions correspond to sections of the optical fiber 1225-1 operated on by signals generated by the sensor units 1205-1 . . . 1205-N. Light, including any perturbations from sensor units 1205-1 . . . 1205-N, propagates through optical fiber 1225-1, including optical elements 1227-1 . . . 1227-M, through fiber section 1226, and into and through optical fiber 1225-2 to interrogator 1220, where such light can be directed to detector 1222. Fiber section 1226 may be an optical coupler between optical fiber 1225-1 and optical fiber 1225-2. An optical coupler may be used at each one of the optical elements 1227-1 . . . 1227-M to couple optical fiber 1225-1 and optical fiber 1225-2 to transmit a sensing signal to detector 1222 of interrogator 1220. A signal sent from an output 1224 of detector 1222 can be analyzed for further processing.

Features of the various arrangements of optical fibers and sensor units as taught herein may be interchanged among the various arrangements, depending on the desired application. Such interchange may include TDM schemes substituted for WDM schemes, TDM schemes substituted for WDM schemes, serial optical circuits for parallel optical circuits, parallel optical circuits for serial optical circuits, and other variations.

In an alternative to effectively using all analog electronics in a high temperature/pressure wellbore, there are applications where lower operating temperature/pressure may be the norm. In such an environment, a digital communication method may provide for allowing a higher data transmission bandwidth and lower noise measurement. In a digital communication scheme, a high bandwidth and low bit error rate method can be used to encode digital data onto the fiber through vibration or strain. For example, various phase-shift keying schemes, commonly used in communication devices, can be implemented. These phase-shift keying schemes can include differential phase shift keying (DPSK), binary/quad phase shift keying (QPSK, etc.), quadrature amplitude modulation (QAM), or other schemes.

Applications of embodiments of sensing as described herein can include distributed pressure and temperature sensing within a wellbore. Also, embodiments of sensing, similar to or identical to sensing scheme as described herein, can be applied to pressure sensing using multiple sensors distributed over a great distance, for example subsea subsidence monitoring where pressure is an important parameter. By using DC power from a cable or batteries for power, and by using the fiber optic cable for transmitting the oscillator frequency from a pressure sensitive oscillator, pressure over at least a 25 km distance may be monitored, where distance is limited only by the optical interrogator capabilities and not any electrical constraint.

Embodiments of apparatus and methods of distributed sensing, as described herein, allows for arbitrarily distributing sensor nodes at any desired spacing down to the spatial resolution of the distributed fiber optic sensor (typically, less than 10 m). The sensor nodes can be made using conventional sensing technologies, for example, a quartz crystal to measure pressure or temperature, while allowing for a simplified sensor design due to simplified electronics. In a conventional electronic quartz pressure sensor, there are limitations concerning the number of sensors that can be multiplexed and the distance that the electrical signal can travel. For example, there are existing conventional quartz pressure gauges that are limited typically to 3 or 4 sensors and an operating temperature maximum of 200° C. Embodiments of apparatus and methods of distributed sensing, as described herein, can overcome both limitations by providing a method that supports tens or hundreds of sensors and temperatures above 200° C.

In addition, using conventional electronic sensor designs, the longer the electrical cable for carrying frequency information, the more capacitance there is, which reduces the amplitude of the signal, reducing the reduces signal-to-noise. Also, when multiplexing multiple sensors using conventional electronic sensor designs, it may become difficult to distinguish the signals from each sensor, requiring more communication lines to accommodate the sensors. Use of an optical fiber as discussed herein, can avoid these problems associated with using an electrical cable.

Other fiber optic methods to sense pressure use modifications to a fiber cable with Bragg gratings/couplers. In the case of Bragg gratings or couplers, the gratings or couplers must be placed in fixed locations along the fiber ahead of time which will require significant labor and will make the fiber optic cable more fragile and expensive. In addition, the pressure sensors cannot be arbitrarily placed anywhere along the cable, but must be coupled to the locations where the gratings or couplers are located, which limits the flexibility of the system and prevents its use with any previously installed fiber cable that does not contain gratings or couplers. However, in embodiments of apparatus and methods taught herein, sensing pressure by measuring strain on a fiber using distributed interferometry can be conducted with any standard telecom grade single-mode or multi-mode fiber optic cable without any modification to the cable. Such distributed interferometry can use intrinsic backscatter light.

In other measurement methods in commercial systems to date in which static strain sensing is performed using Brillioun backscatter, there is not a direct and repeatable correlation between pressure and strain, which results in an imprecise pressure measurement. In an embodiment, an all-analog scheme as taught herein allows for the use of much simpler and higher reliability electrical designs that can withstand the high temperature and pressure environment of a wellbore.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   making a measurement using a sensor disposed at a location, the measurement corresponding to a parameter related to the location, wherein the sensor includes a circuit having a resonating element that has a complex impedance that changes based on the parameter;
   generating a signal correlated to the parameter in response to the measurement;
   applying the signal to an actuator such that that the actuator perturbs an optical fiber disposed in vicinity of the location, based on the signal, the optical fiber and the actuator arranged in proximity to each other; and
   extracting a value of the parameter at an interrogator coupled to the optical fiber, in response to receiving an optical signal from perturbing the optical fiber, wherein extracting the value includes detecting Rayleigh backscatter from the optical signal.

2. The method of claim 1, wherein extracting the value of the parameter at the interrogator includes using a second optical fiber to transmit an optical signal from perturbing the optical fiber to a detection unit of the interrogator.

3. The method of claim 1, wherein the parameter includes one of a chemical concentration, a pH, a temperature, or a pressure.

4. The method of claim 1, wherein the actuator is in contact with the optical fiber.

5. The method of claim 1, wherein the actuator is at a distance from the optical fiber.

6. The method of claim 1, wherein extracting the value of the parameter includes using an interferometric interrogator.

7. The method of claim 1, wherein the method includes using a number of additional sensors disposed along the length of the optical fiber, each sensor spaced apart from the other sensors of the number of sensors, for selected ones of the number of sensors:
   making a measurement using the respective sensor, the measurement corresponding to the parameter;
   generating a signal correlated to the parameter in response to the measurement; applying the signal to an actuator coupled to the respective sensor such that the actuator perturbs the optical fiber, based on the signal, the optical fiber and the actuator arranged in proximity to each other; and
   extracting a value of the parameter, at the interrogator in response to receiving an optical signal from the perturbing of the optical fiber, wherein extracting the value includes detecting Rayleigh backscatter from the optical signal.

8. The method of claim 1, wherein generating the signal correlated to the parameter in response to the measurement includes generating a difference signal as the difference of the measurement using the sensor and a reference.

9. The method of claim 1, wherein extracting the value of the parameter at an interrogator includes measuring frequency based on one or more of, coherent Rayleigh scattering using interferometry, measuring dynamic changes in attenuation, and measuring a dynamic shift of Brillioun frequency.

10. The method of claim 1, wherein applying the signal to the actuator such that that the actuator perturbs the optical fiber includes encoding digital data onto the optical fiber through vibration or strain of the optical fiber.

11. The method of claim 10, wherein encoding digital data onto the optical fiber includes using a phase-shift keying communication scheme.

12. A method comprising:
making a measurement using a first circuit of a sensor disposed at a location, the measurement generating, from the first circuit, a first signal having a frequency based on a parameter related to the location, wherein making the measurement using the first circuit includes using a circuit having a resonating element that has a complex impedance that changes based on pressure;
using a second circuit of the sensor disposed at the location, the second circuit generating a reference signal having a reference frequency unaffected by the parameter;
mixing the first signal and the reference signal, generating a measurement signal having a measurement frequency;
applying the measurement signal to an actuator such that that the actuator perturbs an optical fiber disposed in vicinity of the location, based on the measurement signal, the optical fiber and the actuator arranged in proximity to each other; and
extracting a value of the parameter, at an interrogator coupled to the optical fiber; in response to receiving an optical signal from perturbing the optical fiber, wherein extracting the value includes detecting Rayleigh backscatter from the optical signal.

13. The method of claim 12, wherein extracting the value of the parameter at the interrogator includes extracting, from the optical signal, a characteristic of the measurement frequency with the measurement frequency equal to a difference between the first frequency and the reference frequency.

14. The method of claim 12, wherein parameter includes one of a chemical concentration, a pH, a temperature, or a pressure.

15. The method of claim 12, wherein using the second circuit includes using a circuit having a resonating element that has a complex impedance, the resonating element of the second circuit arranged to be unaffected by the pressure that changes the complex impedance of the resonating element of the first circuit.

16. The method of claim 15, wherein the resonating element of the first circuit includes a first quartz crystal coupled to pressure external to the sensor such that the first quartz crystal changes frequency based on the external pressure, and the resonating element of the second circuit includes a second quartz crystal not coupled to the external pressure such that the second quartz crystal does not change frequency based on the external pressure.

17. The method of claim 12, wherein the method includes using the optical fiber to determine temperature at the location through a distributed temperature sensing measurement.

18. The method of claim 12, wherein extracting the value of the parameter at an interrogator includes measuring frequency based on coherent Rayleigh scattering using interferometry.

19. The method of claim 12, wherein extracting the value of the parameter at an interrogator includes using a second optical fiber to transmit an optical signal from perturbing the optical fiber by a sensor non-responsive to the parameter, to a detection unit of the interrogator.

20. A system comprising:
a sensor operable to provide a measurement corresponding to a parameter at a location;
a circuit coupled to the sensor, the circuit operable to generate a signal correlated to the parameter in response to the measurement, wherein the circuit includes a measurement circuit and a reference circuit, the measurement circuit including a circuit having a resonating element that has a complex impedance that changes based on the parameter, and the reference circuit having a resonating element that has a complex impedance, the resonating element of the reference circuit arranged to be unaffected by the parameter that changes the complex impedance of the resonating element of the measurement circuit;
an actuator coupled to the circuit to receive the signal and operable to generate a perturbation to an optical fiber based on the signal with the actuator arranged in proximity to the optical fiber; and
an interrogator having the capability to couple to the optical fiber to receive an optical signal from the perturbation of the optical fiber and to extract a value of the parameter in response to receiving the optical signal from the perturbation.

21. The system of claim 20, wherein the parameter includes one of a chemical concentration, a pH, a temperature, or a pressure.

22. The system of claim 20, wherein the actuator is operable to generate the perturbation to the optical fiber with the actuator in contact with the optical fiber.

23. The system of claim 20, wherein the actuator is operable to generate the perturbation to the optical fiber with the actuator at a distance from the optical fiber.

24. The system of claim 20, wherein the system includes a number of additional sensors deployable along the length of the optical fiber, each additional sensor spaced apart from the other sensors of the number of sensors, each additional sensor having an associated circuit and actuator to perturb the optical fiber.

25. The system of claim 20, wherein the circuit includes a measurement circuit and a reference to generate the signal correlated to the parameter in response to the measurement as a difference of the measurement using the sensor and the reference.

26. The system of claim 20, wherein the parameter comprises pressure.

27. The system of claim 26, wherein the resonating element of the measurement circuit includes a first quartz crystal coupled to pressure external to the sensor such that the first quartz crystal changes frequency based on the external pressure, and the resonating element of the reference circuit includes a second quartz crystal not coupled to the external pressure such that the second quartz crystal does not change frequency based on the external pressure.

28. The system of claim 20, wherein the system includes a distributed temperature sensing arrangement using the optical fiber to determine temperature at the location.

29. The system of claim 20, wherein the circuit or the actuator includes an encoder to encode digital data correlated to the parameter in response to the measurement such that the digital data is encoded onto the optical fiber.

30. The system of claim 29, wherein the encoder is arranged to implement a phase-shift keying communication scheme.

31. The system of claim 20, wherein the interrogator is structured to measure frequency based on,
coherent Rayleigh scattering using interferometry,
dynamic changes in attenuation,
a dynamic shift of Brillioun frequency,
or combinations thereof.

* * * * *